June 7, 1966   C. J. WALSH ETAL   3,255,351
PARTICLE DETECTOR OF THE SEMI-CONDUCTOR TYPE
Filed April 19, 1963
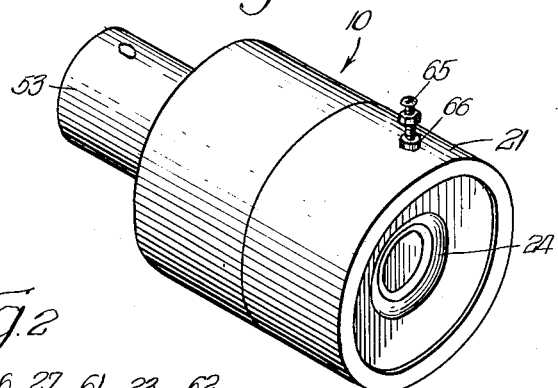
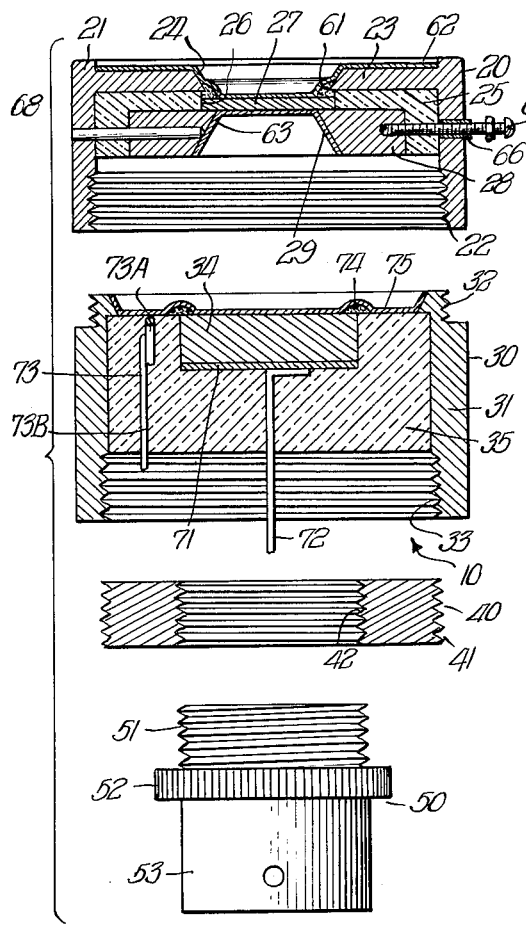
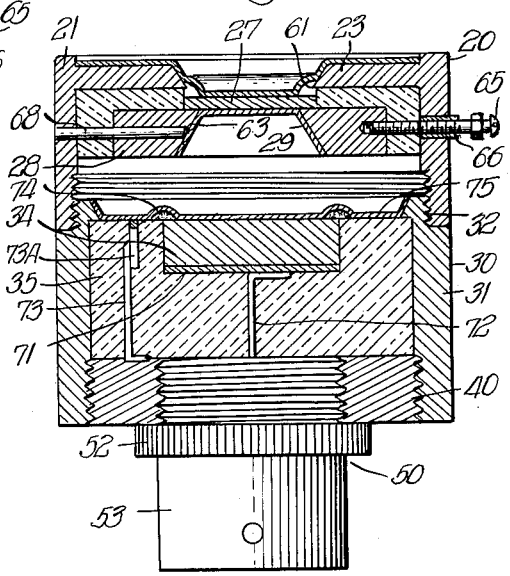
INVENTORS.
Charles J. Walsh,
BY Alan O. Sandborg,
Byron, Hume, Brown & Clement
ATTYS

United States Patent Office 3,255,351
Patented June 7, 1966

3,255,351
PARTICLE DETECTOR OF THE SEMI-CONDUCTOR TYPE
Charles J. Walsh and Alan O. Sandborg, Deerfield, Ill., assignors to Nuclear Diodes, Inc., Highland Park, Ill., a corporation of Illinois
Filed Apr. 19, 1963, Ser. No. 274,148
1 Claim. (Cl. 250—83)

The present invention relates to particle identification systems and particularly to energy detector devices for use in such systems. More specifically, the present invention relates itself to particular means for mounting and detachably supporting in a co-related relationship semi-conductor barriers which operate as energy detector devices in the particle identifier system.

Radiated particles are identifiable by a characteristic number which is determined by formula from the mass and charge associated with the particle. It is known that the transmission of a radiated particle through a semi-conductor barrier will cause a rise in voltage proportional to the characteristic number expressed as a function of the initial energy of the particle, or in other terms, proportional to the mass, charge and energy of the particle. It is also known that when a radiated particle impinges upon and is absorbed in a semi-conductor barrier, the voltage rise generated therein is proportional to the initial energy of the particle. Thus, by impinging a radiated particle upon and transmitting it through one semi-conductor barrier to derive a first voltage proportional to the characteristic number of the particle expressed as a function of energy and then impinging the same particle upon and absorbing it in a second semi-conductor barrier to derive a second voltage proportional to its particle energy, it is possible by the combination of these two voltages to ascertain the characteristic number and thereby identify the particle. Thus, for this type of particle identifier system there must be included a mass-charge-energy detector and also a separate energy detector.

The characteristic of the semi-conductor barrier used in the mass-charge-energy detector varies according to usage which will affect not only its face size but also its thickness and the internal characteristic of resistivity and capacitance. By the same token, the characteristics of the semi-conductor barrier employed in the energy detector must be made variable and selectable in accordance with the particular type of particles which it is preferred to detect and their initial energy. Accordingly, in any adaptable and useful particle identifier system it is important that the MCE (mass-charge-energy) detector and the E (energy) detector both be interchangeable, independent and separate.

It is an object of the present invention to provide a new and improved means for interchangeably supporting and mounting the MCE detector and the E detector of a particle identifier system whereby either or both units may be independently substituted conveniently and without endangering the integrity of the fragile semi-conductor barriers.

The invention, both as to its structure and manner of assemblage will be better understood by reference to the following specification, claims and drawings, forming a part thereof, wherein:

FIGURE 1 is a perspective view of a particle identification detector in accordance with the present invention;

FIGURE 2 is a cross-sectional view, in exploded form, of the particle identification detector in accordance with the present invention; and, FIGURE 3 is a cross-sectional view similar to that of FIGURE 2 with the parts of the particle identification system in assembled relationship.

Referring to the drawings, there is shown therein a particle identification detector 10 including an MCE detector 20, an E detector 30, a coupler disc 40 and a connector 50.

The MCE detector 20 is made up of a conductive housing 21 of a substantially cylindrical shape, the one end thereof being internally threaded at 22 and the other end thereof terminating in a flat disc face 23 carrying therein an aperture 24. In contiguous association with the internal face of the disc 23 is an insulator ring 25, which might be cup shaped as shown in FIGURE 2, and including therein a central aperture 26 concentric with the aperture 24. The insulator ring carries in its central aperture a semi-conductive barrier disc 27. A conductive disc 28 having a central aperture 29 therein is placed in a tight fitting relationship with the insulator ring 25.

Both the conductive housing 21 and the disc 28 are of electrically conductive material of any suitable type here, for example, selected to be stainless steel and the insulator ring 25 might be of Lucite, nylon, or any other workable insulator material. The dimensional relationship between the disc 28, the insulator disc 25 and the conductive housing 21 is such that upon adjustment into the position shown in FIGURE 2 there is a tight press fit whereby the components of the MCE detector are held secured against separation.

The E detector 30 is made up of a basically cylindrical housing 31 having external threads 32 at one end thereof for engagement with the threads 22 of the MCE detector 20. At the opposite end thereof there are internal threads 33. Within the internal diameter of the housing 31 there is carried a semi-conductive barrier 34 supported within an insulator material 35. Again the cylindrical housing 31 is chosen to be of an electrical conductive material, here for example, selected to be a stainless steel, and the insulator material 35 is selected to be of an electrical insulator material such as epoxy resin, Lucite, nylon, and so forth.

The coupler 40 is a simple disc including external threads 41 for mating with the internal threads 33 of the E detector 30. In addition, the coupler 40 includes therein internal threads 42. The connector 50, here illustrated, is of the common BNC coaxial type and includes at one end thereof an external thread 51 for mating with the internal thread 42 of the coupler 40, a knurled flange 52 and a coaxial cylindrical portion 53 for connecting with a conductor. The manner in which all these units are joined is best illustrated in FIGURE 3.

Giving consideration to the manner in which the semi-conductive barrier 27 is mounted to the insulator disc 25, the barrier 27 is generally a very thin disc of purified silicon etched on one surface thereof, in the order of thousandths of an inch thick and of a diameter in the order of five millimeters. It is preferred to support the barrier 27 from the insulator 25 and this is done by potting the barrier within the insulator disc 25 by means of, for example, an epoxy resin bead 61. In this potting operation as best shown in FIGURE 2, alternatively the disc 27 may be supported in the aperture 26 of the insulator plate in resting position on the conductive disc 28. After the semi-conductive barrier 27 has been potted into place around its edge, the outer surface thereof has applied a thin layer of evaporated gold in continuous extension across the face 23 of the conductive housing 21, the epoxy resin bead 61 and the face of the conductive barrier 27. In this way a conductive relationship is established between the conductive housing 21 and the exterior face of the conductive barrier 27. The interior face of the barrier 27 is also coated with a layer 63 of conductive material such as aluminum or gold. This layer extends between the conductive disc 28 and the interior surface of the semi-conductive barrier thereby to complete a good electrical connection therewith. In order to provide an external connection to the internal face of the semi-conductor 27, the conductive housing 21, the insulator disc 25, and the conductive disc 28 are drilled and tapped to receive therein a screw and nut binding post 65. In order to electrically insulate the binding post 65 from the conductive housing 21 an insulator sleeve 66 of plastic material for example, is inserted therebetween.

Turning now to the semi-conductor barrier 34 in the E detector 30, this barrier is a disc of purified silicon material etched on one surface thereof and of a dimension, for example, of approximately 10 millimeters in diameter and a hundredth of an inch in thickness. In its preferred structure the backside of the layer is coated with a nickel layer 71 and has soldered thereto an electrode 72. This barrier with the attached electrode 72 and an electrode 73 are potted in epoxy resin, for example, in a manner so that the front face of the barrier 34 and of the electrode 73 are exposed. This potted configuration is then inserted into the conductive housing 31 as shown in FIGURE 2, the exposed edge of the barrier 34 is potted to the insulator 34 with a bead of epoxy resin 74, and the exposed surface has evaporated thereon a layer 75 of gold so as to make conductive contact between the housing 31, the exposed face of the semi-conductive barrier 34, and the electrode 73. In its specific components, the electrode 73 may be made up of a gold wire 73a in connection with the gold layer 75 soldered to a copper or aluminum conductor 73b.

The electrode 72 is an extension from the detector 30 and is of sufficient length so as to make connection within the coaxial connector 50. The electrode 73b is in short projection beyond the surface of the insulator disc 35 so that upon joining of the coupler disc 40 with the detector 30 frictional connection is made between the disc 40 and the electrode 73.

The layer of gold evaporated onto these surfaces is not critical, but should be in the order of 50 micrograms per square centimeter. The epoxy resin used to seal the perimeter between semi-conductive barriers and their insulator supporting arrangements is preferably, although not necessarily, doped with iodine.

The components are all joined as shown in FIGURE 3 whereby upon application of a reference voltage to the outer housing of the connector 50 a common potential is established on the layer 62 of the MCE detector 20 and the layer 75 of the E detector 30. By means of the binding post 65 an electrical connection can be made to the opposite surface of the semi-conductive barrier 27, thereby providing facilities for establishment of a potential across the barrier and for measuring changes in potential across the barrier. By the same taken, connection to the electrode 72 in extension from the detector 30 into the connector 50 provides a means both for establishment of a potential across the barrier 34 and for measuring any changes of potential that occur across the barrier 34. Inasmuch as it is not unusual for this configuration to be used in an evacuated chamber, it is sometimes preferable to include in the MCE detector a breather hole in extension through the side wall of the conductive housing 21, the insulator disc 25, and the conductor ring 28. In this manner any pressure differential is relieved from the fragile semi-conductor barrier. In a preferred embodiment the MCE detector is separated from the E detector by approximately ¼ inch, or slightly less and both are mounted in stainless steel cases by resilient means in a rugged fashion so as to withstand normal handling without breakage.

In view of the foregoing disclosure, it is clear that there has been provided here a new and improved structure and arrangement for a particle identification system including a mass-charge-energy detector and an energy detector. The arrangement and structure disclosed herein is at present considered to be preferred. However, it is appreciated that those skilled in the art may make variations therein without departing substantially from the scope thereof. Accordingly, it is the intention of the present application to cover in the appended claim all such variations and modifications as fall within the true spirit and scope of the invention hereof.

We claim:

In a system for identifying intercepted radiation particles, an energy detector device comprising: a first detector including a first apertured conductive housing, an insulator plate supported in said first conductive housing and apertured concentrically with said first conductive housing, a first semi-conductor barrier mounted to said insulator plate at the aperture thereof, said first semi-conductor barrier being of a thickness so as to dissipate in said barrier without totally absorbing energy of any one of said intercepted radiation particles, a conductive coating between the one surface of said first semi-conductor barrier and said first conductive housing, and a first electrode in extension from the other surface of said first semi-conductor barrier; a second detector including, a second apertured conductive housing formed to detachably engage the first conductive housing of said first detector coaxially with the apertures therein, whereby said one radiation particle is received in the aperture of said second conductive housing, a second semi-conductor barrier electrically insulated from and mounted to said second conductive housing in the aperture thereof, said second conductive barrier being of a thickness so as to absorb substantially all of the remaining energy of said one intercepted radiation particle, a conductive coating between the one surface of said second barrier and said second conductive housing, and a second electrode in extension from the other surface of said second barrier; and a conductive base connector formed to detachably engage said second conductive housing for applying a reference voltage to said first and second housings and to the surfaces of said first and second barriers electrically connected thereto, whereby at said first electrode a potential can be established across said first barrier and changes in potential responsive to dissipation therein of the energy of said one radiation particle can be detected, and whereby at said second electrode a potential can be established across said second barrier and changes in potential responsive to absorption therein of the energy of said one radiation particle can be detected.

References Cited by the Examiner
UNITED STATES PATENTS

| | | | |
|---|---|---|---|
| 2,756,348 | 7/1956 | Schneider | 250—83.6 |
| 2,825,816 | 3/1958 | Rogers | 250—83.3 X |
| 2,843,748 | 7/1958 | Jacobs | 250—83.3 X |
| 3,043,955 | 7/1962 | Friedland et al. | 250—83.3 |

RALPH G. NILSON, *Primary Examiner.*

ARCHIE R. BORCHELT, *Examiner.*